Nov. 22, 1932. W. F. GROENE ET AL Re. 18,662

MACHINE TOOL

Original Filed Jan. 12, 1928 11 Sheets-Sheet 1

INVENTORS
William F. Groene
BY Harold J. Stakmann
Allen & Allen
ATTORNEYS

Nov. 22, 1932. W. F. GROENE ET AL Re. 18,662

MACHINE TOOL

Original Filed Jan. 12, 1928 11 Sheets-Sheet 2

INVENTORS,
William F. Groene
BY Harold J. Stekmann
Allen & Allen
ATTORNEYS.

Nov. 22, 1932. W. F. GROENE ET AL Re. 18,662

MACHINE TOOL

Original Filed Jan. 12, 1928 11 Sheets-Sheet 3

INVENTORS
William F. Groene
BY Harold J. Siekmann
Allen & Allen
ATTORNEYS.

Nov. 22, 1932. W. F. GROENE ET AL Re. 18,662

MACHINE TOOL

Original Filed Jan. 12, 1928 11 Sheets-Sheet 4

INVENTORS
William F. Groene
BY Harold J. Eikmann
Allen & Allen
ATTORNEYS.

MACHINE TOOL
Original Filed Jan. 12, 1928 11 Sheets-Sheet 5
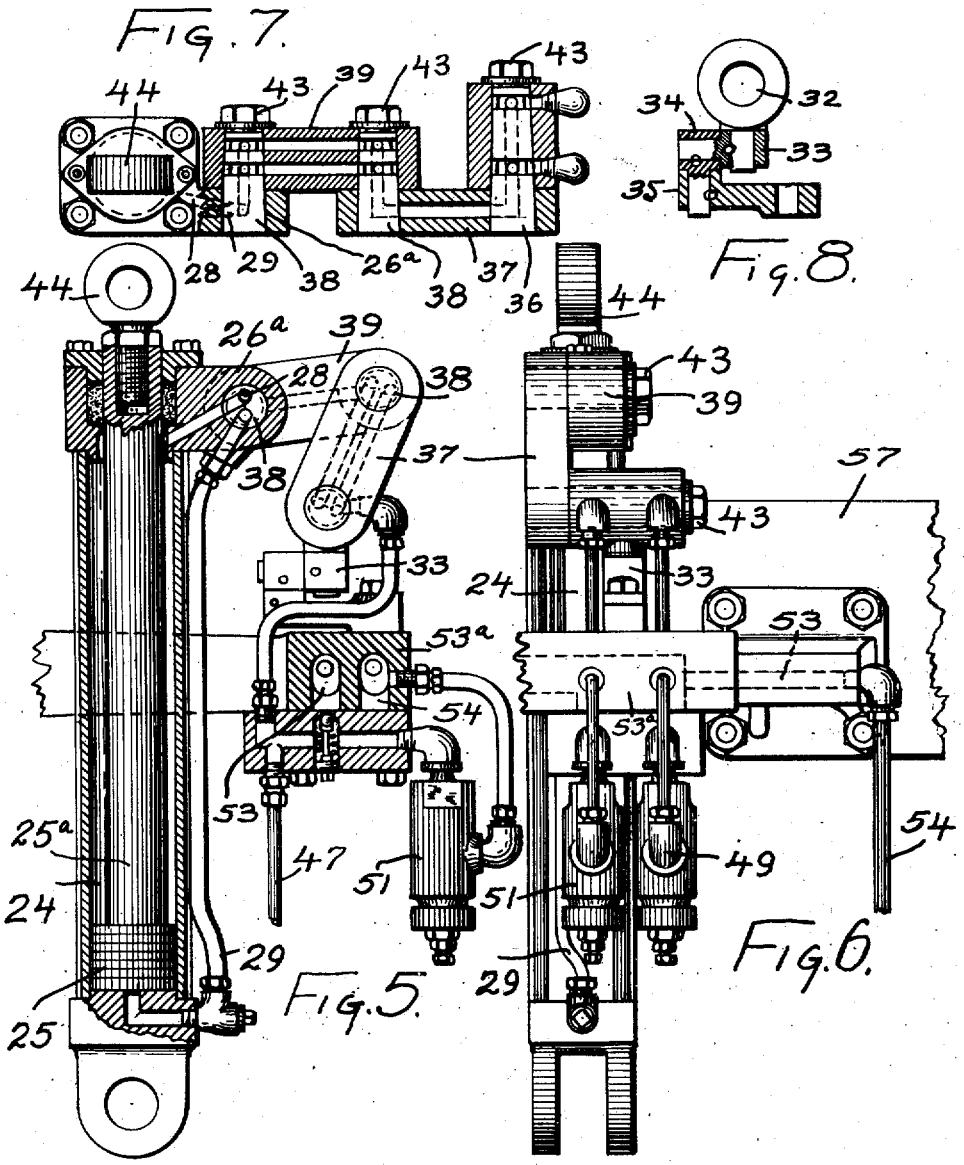
INVENTORS
William F. Groene
BY Harold J. Sukmann
Allen & Allen
ATTORNEYS MACHINE TOOL
Original Filed Jan. 12, 1928 · 11 Sheets-Sheet 6
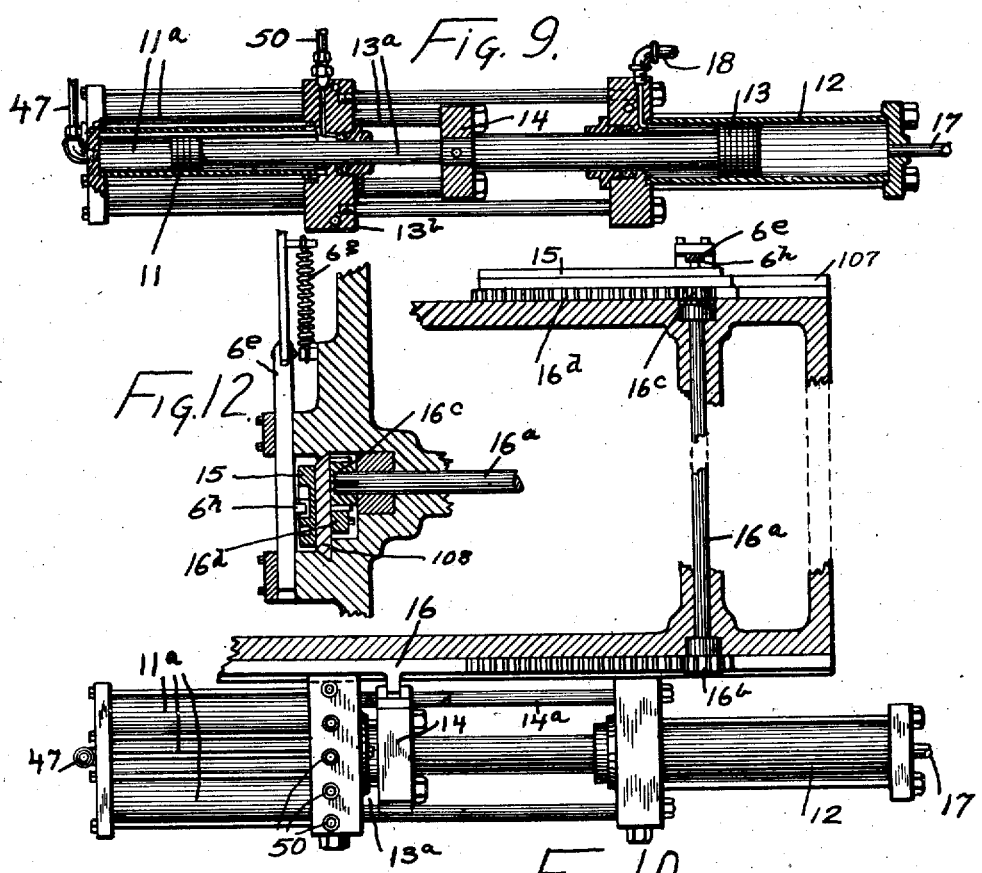
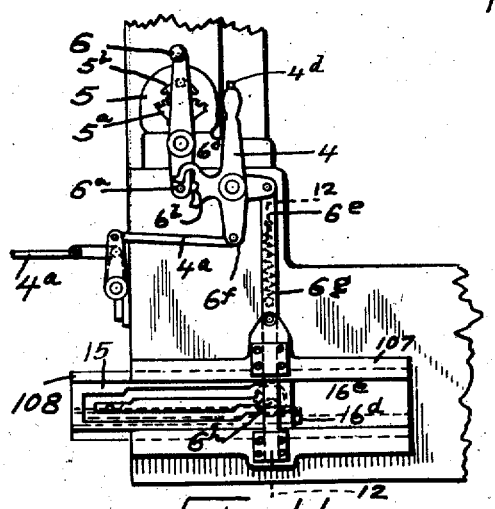
Fig. 11.
INVENTORS
William F. Groene
BY Harold A. Siekmann
Allen & Allen
ATTORNEYS INVENTORS
William F. Groene,
BY Harold J. Siekmann
Allen & Allen
ATTORNEYS INVENTORS
William F. Groene
BY Harold J. Siekmann
Allen & Allen
ATTORNEYS

MACHINE TOOL

Original Filed Jan. 12, 1928 11 Sheets-Sheet 9

INVENTORS
William F. Groene
BY Harold J. Siekmann
Allen & Allen
ATTORNEYS

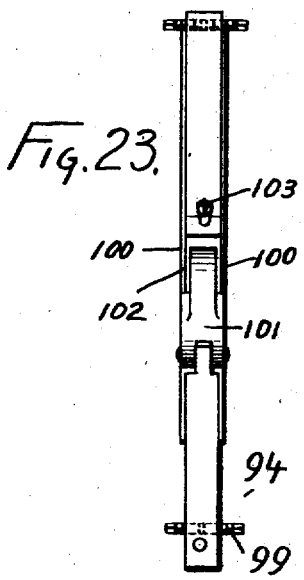
Fig. 23.
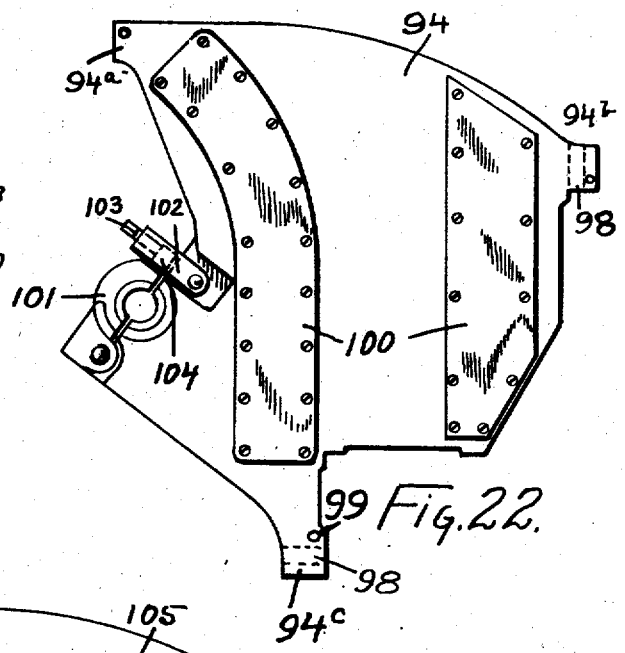
Fig. 22.
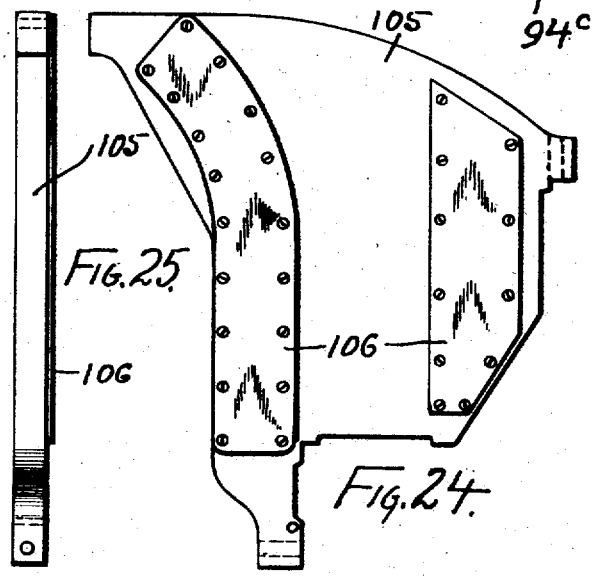
Fig. 25.
Fig. 24.
INVENTORS
William F. Groene
BY Harold J. Sickmann
Allen & Allen
ATTORNEYS INVENTORS
William F. Groene
BY Harold J. Siekmann
Allen & Allen
ATTORNEYS Reissued Nov. 22, 1932

Re. 18,662

UNITED STATES PATENT OFFICE

WILLIAM F. GROENE AND HAROLD J. SIEKMANN, OF CINCINNATI, OHIO, ASSIGNORS TO THE R. K. LE BLOND MACHINE TOOL COMPANY, OF CINCINNATI, OHIO, A CORPORATION OF DELAWARE

MACHINE TOOL

Original No. 1,744,885, dated January 28, 1930, Serial No. 246,314, filed January 12, 1928. Application for reissue filed January 21, 1932. Serial No. 588,021.

Our invention relates to machine tools and more particularly to tools having a series of moving working members having elements thereon which must be moved with relation to the actuators. It also relates specifically to crank shaft lathes.

In discussing the various points of our invention, we will refer chiefly to crank shaft lathes as being illustrative of those aspects of our invention which have a broader application in the machine tool art.

One of the points of our invention lies in the provision of a feed for tool carrying members in machine tools using hydraulic power supply. More particularly we have combined a single source of hydraulic energy arranged to deliver a constant volume, at varying pressures, with a series of pistons driven by the hydraulic energy, one piston driving each feeding device, and have arranged for an automatic control of such a power supply system.

Expressing our invention in more detail we provide a pump preferably of oil gear type, which delivers a constant volume of oil to the oil lines involved at any one valve setting. The oil is directed by a valve which is so arranged as to deliver a high volume and a low volume in forward or reverse direction through the lines. The lines are connected to a master cylinder in which a piston is moved in alternate directions, depending upon the direction of the oil imparted by the valve, and at a speed controlled by the volume of oil delivered. The master cylinder piston is connected to a cross head which has secured thereto a series of pistons, one for each of a primary series of oil cylinders, which oil cylinders deliver oil according to the thrust of the pistons therein to tool feeding or secondary cylinders, which tool feeding cylinders are operated to feed the tools into the work or withdraw them therefrom depending upon the direction of the piston in the secondary system. The use of a cross head and a mechanical connection to the primary set of pistons is preferred by us to a hydraulic connection from the master cylinder to the primary cylinders, which would be generically similar.

As an application of this system of control, we illustrate a crank shaft lathe having a series of members actuated by two cam shafts so that they move in an eccentric path with relation to the axes of the cam shafts. This eccentric path, for each member, corresponds with the path traversed by a crank pin on a crank shaft to be cut, said shaft being mounted and rotated in the lathe. This double cam shaft operation has been suggested prior to our invention, and our improvement thereon consists in compensating for slight variations and twists in the members by floatingly connecting the members to one of the cam shafts. The arrangement of eccentrics and tool holders permits of easy loading of the work and permits of a complete shielding of the lower eccentric from falling chips.

We have devised a mode of mounting cutting tools and feeding them into work relation with the crank pin of a shaft from both sides of the pin, each tool feeding or holding device being movable to and from the work from opposite sides. We accomplish the feed of the tool holders in a manner which prevents chatter and play, since, according to our construction, the thrust against the one tool holder acts in opposition to the thrust of the other against a common gear which actuates both of them. In our illustrated machine, there are a series of cam actuated members, each provided with our novel tool feeding devices, and the common gear for each feed is rotated by hydraulic pressure using our novel system of distribution and control.

By the use of hydraulic operation, we are enabled to bring the cutting tools to positive stops without injuring the power transmission mechanism, the stopping of the tools simply serving to build up pressure in the oil feed system.

We have provided in various ways for the perfect operation of tools operating conjointly and simultaneously from opposite sides of all of the crank pins of a crank shaft, as will be hereinafter more specifically pointed out.

We illustrate our invention by a specific embodiment thereof exhibiting the various inventive features involved, which inventive features will be set forth in the claims that follow.

In the drawings:—

Figure 5 is a central vertical section taken through one of the tool operating cylinders, with the hydraulic feed thereto partly in section.

Figure 6 is an elevation taken at the right hand end of Figure 5.

Figure 7 is a section taken centrally through the flexible conduit device shown in Figure 5, which device is bent out of operating position into a straight line for purposes of illustration.

Figure 8 is a detail section taken through the mounting of the part shown in Figure 7 to the fixed portion of the machine.

Figure 9 is a longitudinal section taken through the master oil cylinder and its connections.

Figure 10 is a side elevation of the parts shown in Figure 9 with the automatic control connections.

Figure 11 is a detail front elevation of the automatic control cam and control lever system.

Figure 12 is a detail section on the line 12—12 of Figure 11.

Figure 22 is a side elevation of one of the work supports.

Figure 23 is a front elevation of the same.

Figure 24 is a side elevation of the right hand thrust frame.

Figure 25 is a front elevation of the same.

Figure 1:
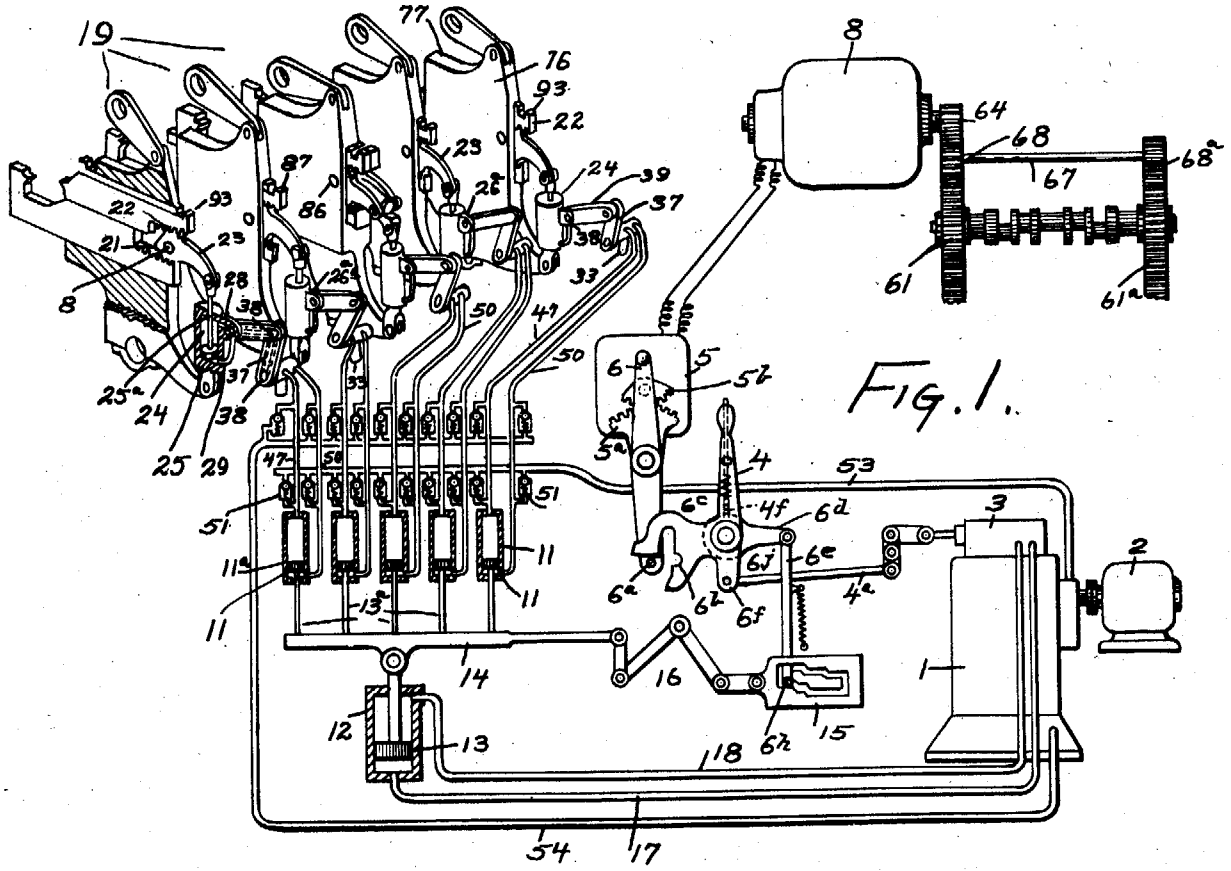
Figure 1 is a diagrammatic view illustrating the mode of operation of the illustrated embodiment of our invention.

The diagrammatic view in Figure 1 will illustrate the mode of operation of the machine and will primarily be described in full, using reference numerals which so far as possible are carried into the other views.

The oil gear type pump is shown at 1, as being driven by a motor 2. This pump has a valve structure at 3, by means of which the volume of oil delivered from the pump can be controlled, so as to stop the delivery, or direct it in opposite directions, with high volume or low volume in each direction. This valve and pump are procurable on the market, and have not been illustrated in detail.

Figure 13:
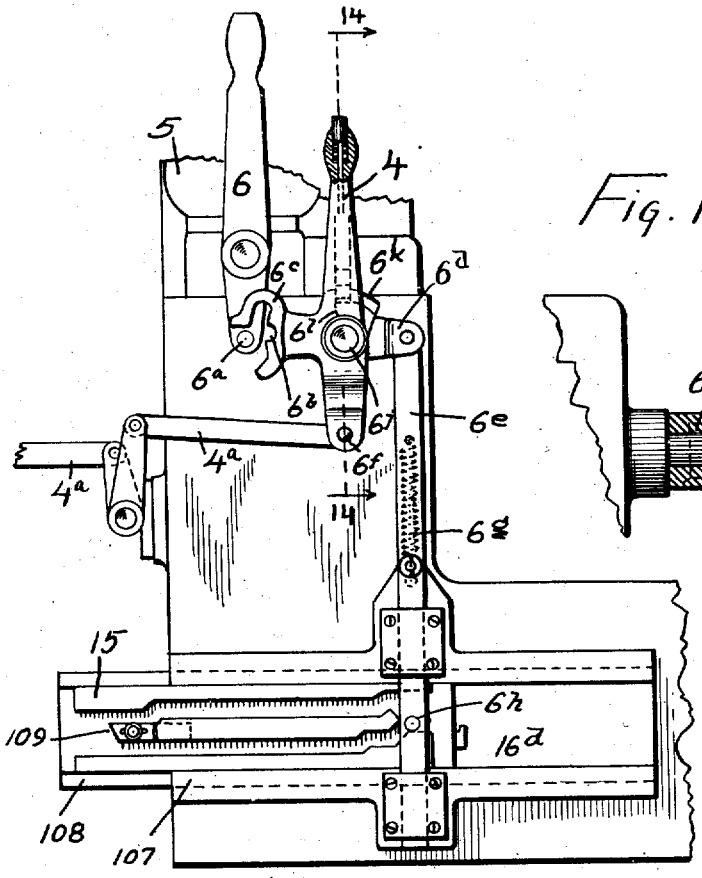
Figure 13 is a view in large scale of some of the parts shown in Figure 11.
Figure 14:
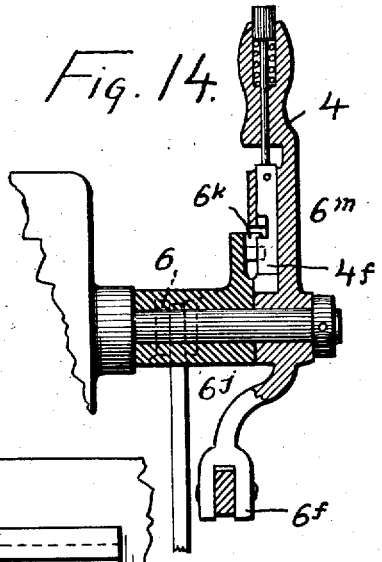
Figure 14 is a detail section on a larger scale than Figure 13 taken on the line 14—14 of Figure 13.
Figure 16:
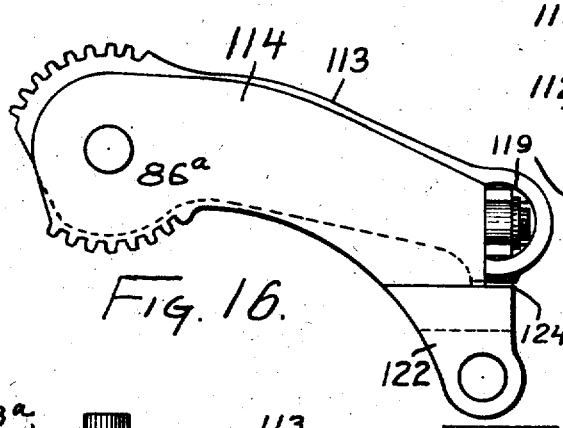
Figure 16 is a detail side elevation of the center one of the tool operating arms.
Figure 18:
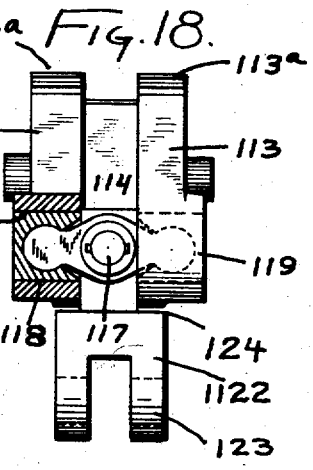
Figure 18 is a rear elevation of the part shown in Figure 17, partly in section.
Figure 17:
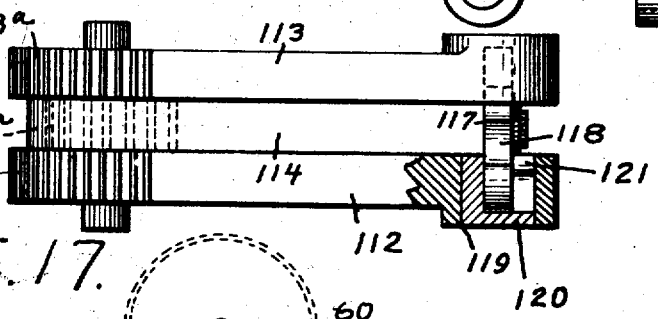
Figure 17 is a plan view of the tool operating arm for the center tool element of the machine.

The valve is operated by a rod 4*a*, which is connected to an arm 6*f*. This arm is part of a casting which includes a lever 4, and a notched plate 6*c*. On the shaft 6*j* which supports this casting (see Figs. 13 and 14) is a sleeve on which is an arm 6*d*. The sleeve has an arcuate rib 6*k* and a shoulder 6*p*. The arm 4 has a spring plunger 4*f* therein, that has a notch 6*m* of the size of the arcuate rib 6*k*.

When the spring plunger is depressed, the lever 4 can be moved without moving the sleeve and the arm 6*d*, if it is moved in such a direction as would depress the arm 6*d*.

Normally the lever 4 is actuated to start the mechanism and the control of the movement of the casting thereafter is accomplished by a master cam. The cam thus operates the valve 4 through the medium of the casting, the arm 6*f*, and the rod 4*a*.

A motor starting switch is housed in a box 5, through which power to the main drive motor 8 of the machine is supplied. A lever 6 having a sector plate 5*a* thereon operates the starting switch through a sector 5*b*.

The notched plate portion 6*c* is so arranged that when a pin or roller 6*a* at the lower end of the lever 6 is moved to the right accompanying the movement of starting the motor 8, it will move into the notch 6*b*. When the lever 6 is then moved to full running position the pin 6*a* will lie in the main notch of the portion 6*c*, which will permit the plate to be operated, thus moving the rod 4*a* and actuating the control valve. Thus, while the motor is being started the valve control system is locked, and when the motor is in running condition the control system is operative.

The arm 6*d* is connected to a link 6*e* upon which link a spring 6*g* is applied, tending to keep the arm 6*f* to the left and the valve in shut-off condition.

The control cam is shown diagrammatically at 15, and engages a roller 6*h* on the end of the rod 6*e*. This control cam is thus in a position to move the plate 6*c*, when it is released for movement by the lever 6 and its pin 6*a*, but not otherwise. The machine now being in operation, the lever 4 is moved to initiate the hydraulic flow, which cannot be done in a normal way, unless the motor is running. Abnormal or emergency movements of the control valve without effecting the other mechanisms are provided for by means of the spring plunger 4*b*, as has been noted.

A master cylinder is shown at 12, having a piston 13 therein. The pipe line or conduit 17 from the control valve extends to the bottom of this cylinder, and the conduit 18 to the top thereof. Dependent upon the position of the valve, oil at a constant volume of delivery, substantially irrespective of the pressure resisting its flow, will enter the cylinder 12 and push the piston in one direction or the other.

The piston is connected to a cross head 14, which is in turn connected to a series of piston rods 13*a* for the pistons 11. These pistons move in cylinders 11*a* and act to force oil into or withdraw oil from the tool actuating oil cylinders.

We have shown as a simpler diagram than the specified mechanism employed, a connection 16 between the cross head 14 and the master cam 15. The connection is intended to illustrate that the cam moves lengthwise, as the cross head is moved by the master piston.

The advantage of this single control system for all five of the pistons 11 is considerable, because all of them can be stopped, started, and moved fast or slow simultaneously by control from a single point.

A conduit 53 is shown, which supplies the distributing system or secondary oil supply system composed of the cylinders 11*a* and their various connections with a full supply of oil at all times. This conduit is protected by a series of check valves 51. The conduit 54 is also indicated, constituting an overflow conduit for the secondary system, the system being kept in its normal condition through the protection of the check valves indicated at 49.

Conduits 47 extending from the one end of each cylinder 11*a* supply oil under pressure from the several cylinders to the tool operating system. Conduits 50 supply oil from the other end of each cylinder to the tool operating system. Dependent upon which direction the pistons 11 are moved, the operating pistons of the tool operating system will be moved in a corresponding direction.

The flexible joints or conduits connecting the conduits 47 and 50 to the tool operating system are illustrated as in the form of two arms 37 and 39 connected rotatably by a tapered plug 38, as will be more specifically described, and coupled to the joints 26*a* and 33 at the two ends.

These flexible connections keep the two oil streams separate, so that one set of conduits acts as a return line when the other set is supplying the motive force to the tool operating pistons.

Thus the conduit 29 and the conduit 28, from the terminal connections 26*a* of the flexible conduit connections, are continuations in effect of the respective conduits 47 and 50.

Within the cylinders 24, which are supported on the movable tool slide carrying frames of the machine, are the pistons 25, whose piston rods 25*a* connect to the operating arms 23. Rack bars 21 and 22 held slidably in the carrying frames are engaged by gear teeth on the ends of the arms 23, so that as the arms are rocked by the action of the pistons 25, the rack bars will be moved either both of them toward a common point, or both away from a common point. The rack bars serve as tool carrying slides, as will be noted.

Figure 20:
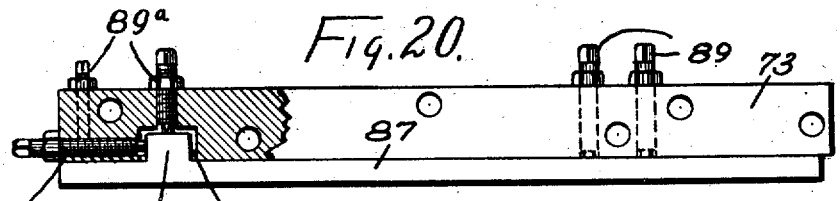
Figure 20 is a detail elevation of the upper bar of one of carrying frames, broken away to show the gib adjustment.
Figure 21:
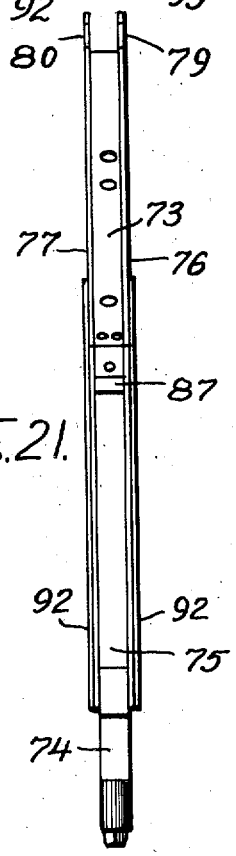
Figure 21 is a front elevation of a complete carrying frame.
Figure 19:
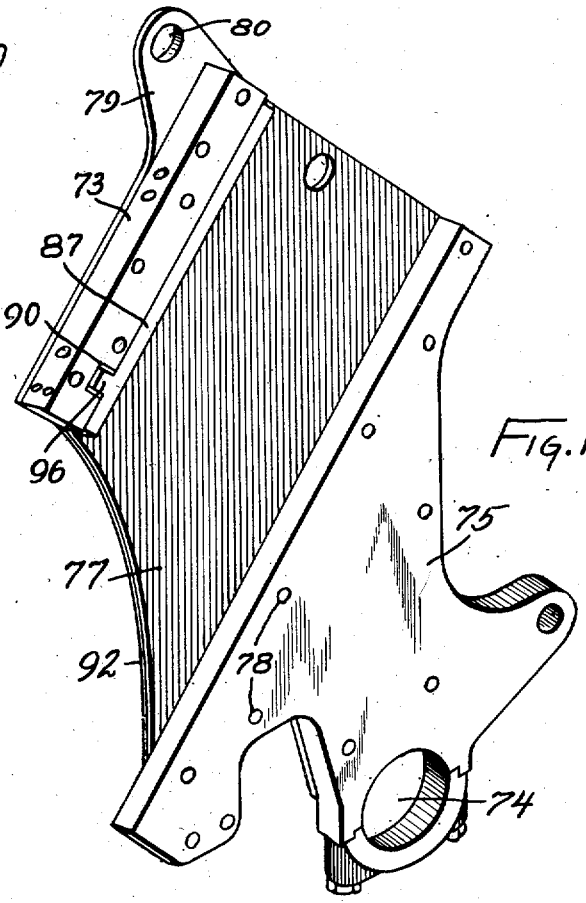
Figure 19 is a perspective of one of the tool slide carriers or cam operated members, with its side plate removed.

The diagram illustrates the carrying frames at 19, the pivots of the tool operating arms at 86, and the stop lugs for the tool slides or rack bars at 93. For the details of the carrying frames we refer to Figures 19–21.

Figure 2:
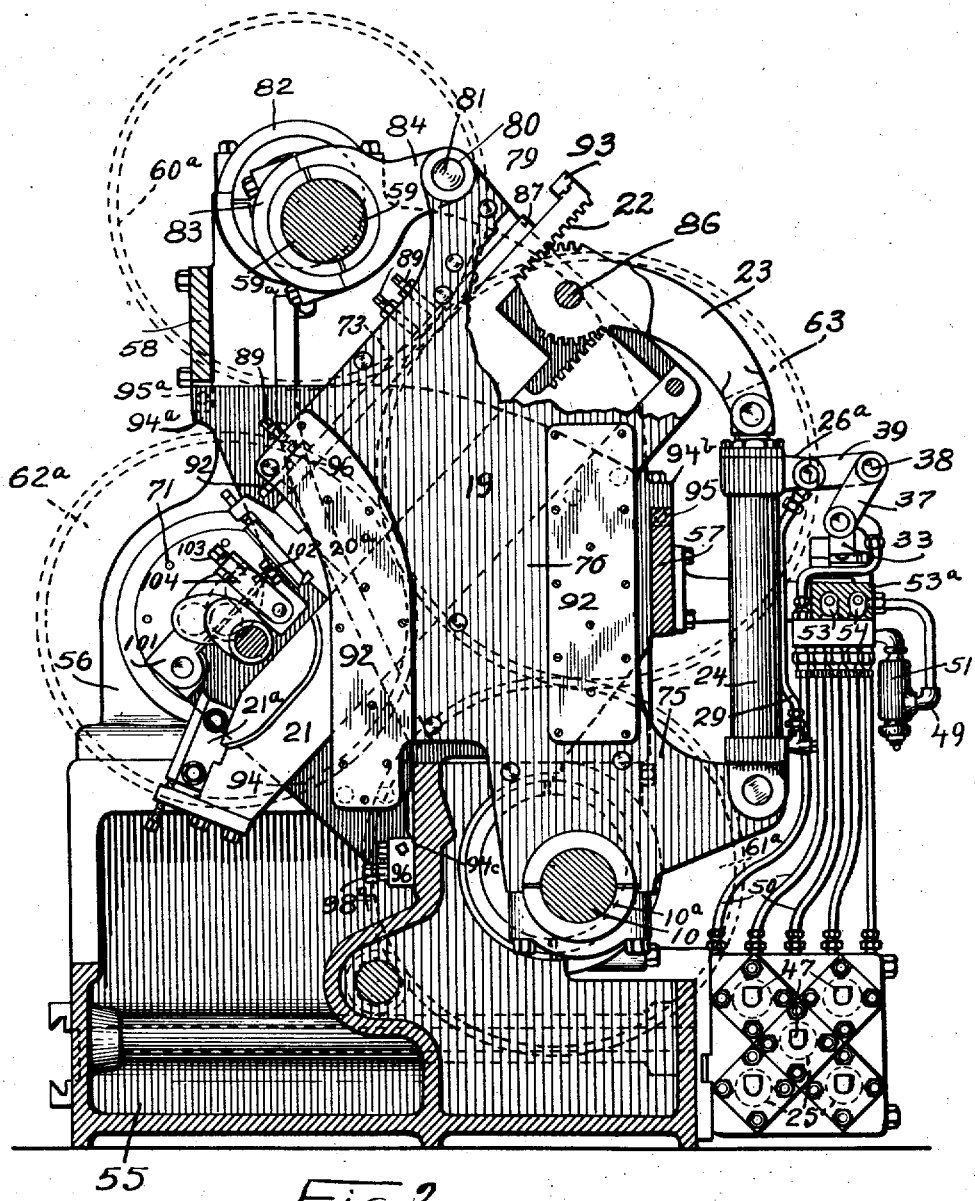
Figure 2 is a vertical cross section of the machine taken at the outside of the right hand cam driven member.
Figure 3:
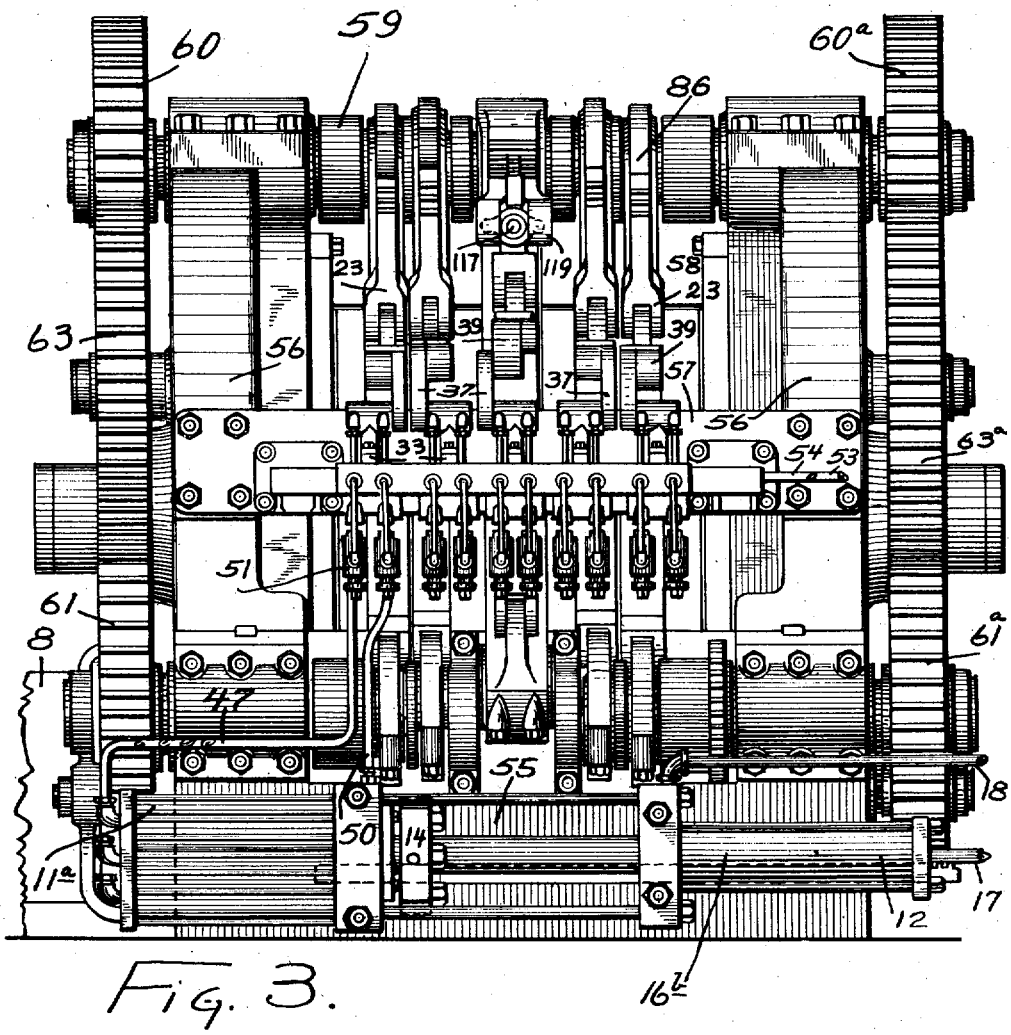
Figure 3 is a rear elevation of the machine.
Figure 4:
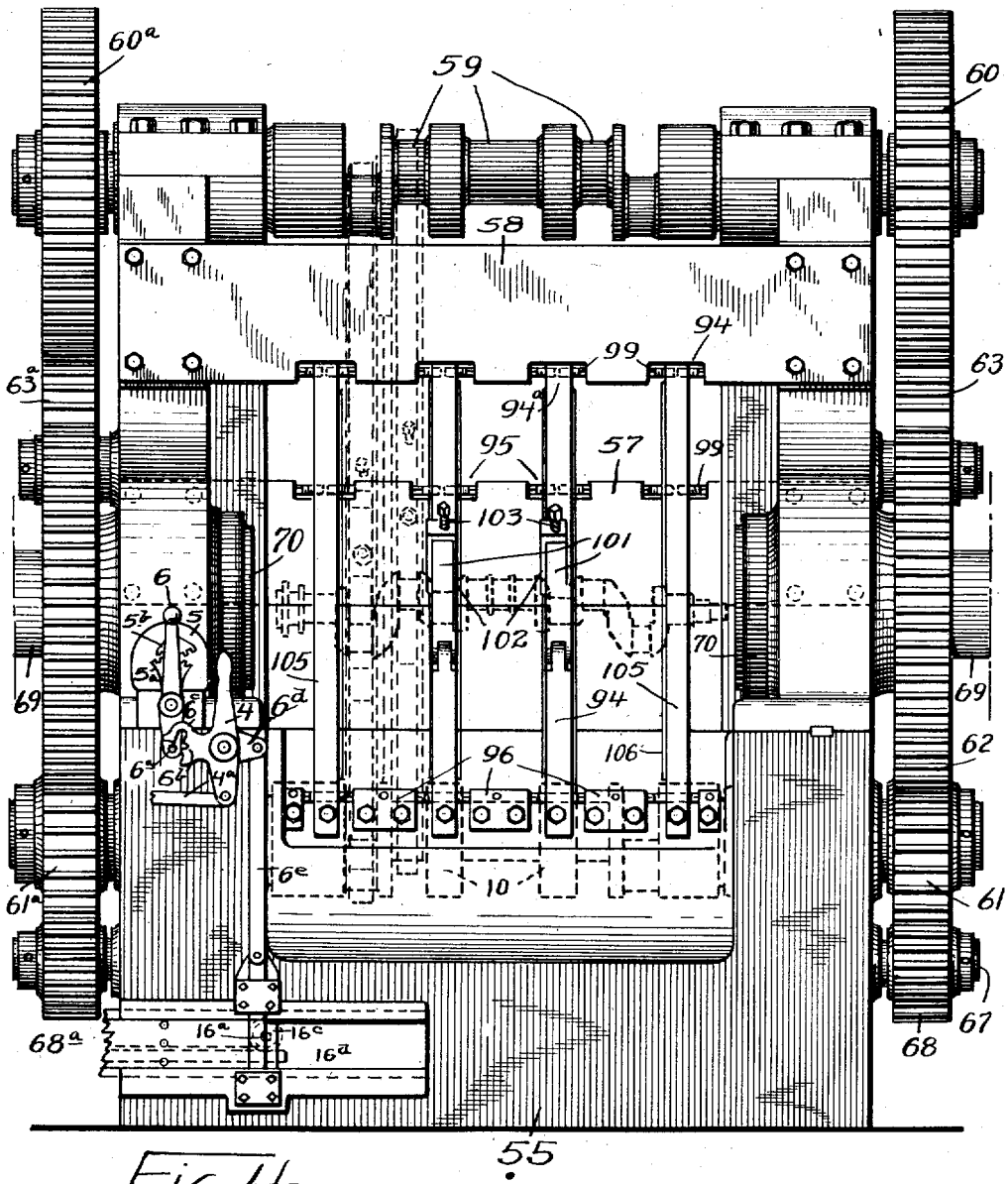
Figure 4 is a front elevation of the machine, with the drive omitted.

Referring first to Figures 2, 3 and 4, in which the assemblies of the machine are shown, we have indicated the base of the machine at 55, from which the uprights or housings 56 extend.

Figure 15:
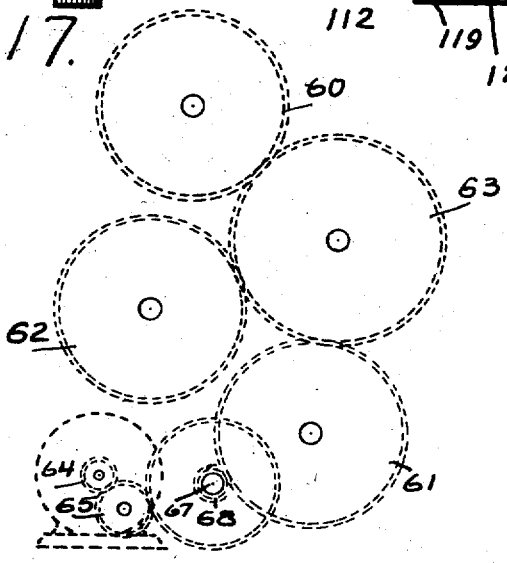
Figure 15 is a diagram of the drive connections for the lathe.

Tie bars 57 and 58 extend across the back and front of the machine and serve in mounting the thrust frames 105, as will be noted. The master cam shaft 59 extends between bearings near the upper ends of the housings, and is equipped with gears 60 and 60*a* on either end thereof. The lower master shaft 10 is mounted in bearings in the base and is equipped with gears 61 and 61*a* at either end (see diagram Fig. 15).

The two spindles of the machine noted at 69 have head plates 70 provided with holes 71 therein for bolting in place any suitable chucking device for gripping a crank shaft to be operated upon.

Idler gears 63, 63*a*, mesh with the gears 60, 60*a*, and 61, 61*a*, at each side of the machine. The spindles are equipped with gears 62, 62*a*, which mesh with the idlers 63 also.

The drive gear at 64, which derives its power from a motor 8 or any other desired source, meshes with an intermediate gear 65, which drives a cross shaft 67 equipped with gear 66 which meshes with 65. The cross-shaft carries at its ends the gears 68 and 68*a* which drive the gears 61 and 61*a*, thus providing a positive and matched drive for both ends of the cam shafts, and for both spindles.

The master shafts or cam shafts, as indicated, are so arranged that the eccentric portions 59*a* and 10*a* will correspond with the eccentricity of the crankpin of the shaft to be operated upon. The shaft to be operated upon is so chucked as to revolve on its main bearings as a center, and the tool carrying frames on the master or cam shafts will move around so as to follow the movement of the crank shaft, that constitutes the work.

The carrying frames are built up of a pair of side plates 76 and 77 bolted over top and bottom frame members 73 and 75 respectively. The bottom frame member has a bearing 74 to engage over the desired eccentric on the bottom master shaft. The upper ends or extension 79 of the two side plates contain holes 80 for the bearing pin connection to the selected eccentric of the upper master shaft. Rivets passed through holes 78 will be the preferred mode of securing the parts of the frames.

Thus, a bearing pin 81 engages the end 84 of a yoke, and holds it between the two side plate extensions 79. The yoke, as at 82, engages over the selected eccentric on the master shaft, the outer portion of the split-bearing over the eccentric being provided by the bearing cap 83.

The space between the side plates of the carrying frames is used for mounting the tool slides. The slides are two in number and fit snugly between the side plates laterally. The slide 21 at the lower part of the frame bears on the plate 75, and the upper tool slide 20 bears on the top of the slide 21 and is held down by means of a gib, to be described. The two slides have teeth 22 thereon, at the upper end, and means for holding cutting tools 20*a* and 21*a* at the lower end. The operating arm 23 is mounted on a stud or bearing pin 86, set into the two frame side plates, with its teeth 23 meshing with the teeth on the two rack bars.

The act of rocking the arm will cause the two slides to move either toward each other or away from each other, thus bringing the two tools 20*a* and 21*a* toward the work, or away from the work. The load on either one of the tools will tend to resist the motion imparted to its slide by the gear, and the load on one tool is opposed to the load on the other, so that a balanced and non-chattering relationship is established.

The gib 87, mounted to bear against the upper slide and against the upper plate 73 of the tool slide carrying frame, serves as a stop for tool movement. Depending upon the position of the gib lengthwise of its mounting (Fig. 20) it will engage the lug 93 of the slide 22. When the upper slide is stopped, the lower slide stops also.

The gib is held down against the upper slide by means of set screws 89. The gib has a lug 96 thereon which lies in a socket or chamber 90 in the upper frame plate 73, said socket being larger than the lug. A set screw 89*a* engages the top of the lug in this socket, and a set screw 92 engages the lug from the front.

In adjusting the gib lengthwise, the screw 92 is employed. It can be seen that this screw 92 will prevent the gib from moving when the lug 93 on the upper slide engages the gib. The lug 93 will preferably be a removable block of metal which can be changed to extend the limits of adjustability of the stop mechanism.

On the outer faces of the tool carrying frames are mounted face plates 92 of hardened steel, said plates serving to contact with like bearing plates on a series of intermediate non-moving plates which interspace pairs of the tool carrying frames of the device.

The central carrying frame is different from the others in this particular machine, being of double the width of the others and carrying more than one set of slides. It will be described below, but may be considered as a double frame, as compared to a pair of independent frames.

The intermediate plates (Figs. 23–25) are either mere bearing frames which engage and space the carrying frames, or they are used for steady rests for the crank shaft being operated upon. In this instance the intermediate plates serve also as steady rests.

The two tie bars have notches in them, the upper tie bar 58 having notches 95*a*, and the lower tie bar having notches 95. A series of blocks 96 are mounted along the base of the machine leaving spaces between them (Fig. 4) which also act in the same manner as the notches in the tie bars.

One of the steady rest intermediate plates is illustrated at 94, having projections 94*a*, 94*b*, and 94*c*. The projection 94*a* is set into the notch arranged for it in the tie bar 58. The projection 94*b* is set in the notch in the tie bar 57 arranged for it, and the projection 94*c* lies in the spaces between the blocks 96 on the machine base. Bolts 98*a* passing through holes 98 in the projections 94*b* and 94*c* mount the plate in place, the holes being slightly larger than the bolts. Set into each side of each of the projections are set screws 99, whose heads bear against the side walls of the notches in which the projections lie.

By adjusting the set screws the plate can be very accurately centered and placed, after which the bolts are brought down tightly so that the plate is firmly bound, and constitutes one of the frame members of the machine.

Hardened steel face plates 100 on the members 94 match and bear against the like plates on the carrying frames, as has been noted.

Clamps 101 mounted at the front intermediate portion of the members 94 serve to form bearings together with the plates, which bearings engage over the journal pin of the work to be supported or steadied. The clamps and the face of the plates 94 are suitably bushed, and a swinging yoke 102 held to the plate 94 can be used to engage and hold down the clamps 101 in the several steady rests engaging lugs 104 on the clamps by means of set screws 103.

The steady rest plates are used intermediate the housings and at the two ends of the assembly and next to the housings, thrust plates 105 (Figs. 24 and 25) are employed, which have a like mounting to the steady rest plates, and have the face plates 106 on the inner sides thereof only. These plates 105 serve as end thrust members for the assembly, and will be formed as a right and left plate with the face plates or facings 106 on the inner side.

The entire assembly, it will be noted, is excessively strong and rigid, presenting practically a solid block of metal across the machine so as to prevent side play to the greatest extent to the toll carrying member and work steady rest plates. The whole structure is furthermore subject to adjustment.

By reference to Figs. 3, 4, 16, 17, 18 and 26, it will be noted that the central one of the carriers may be built in a multiple relation, so as to permit of cheeking the webs and cutting the pins at the middle of the shaft to be turned.

The carrier in this case is wider than the other carriers, the lower tool slide is wider and there are two upper tool slides instead of one. The operating arm with its gear toothed end is a multiple construction instead of a single one as in the former instance, and it is required that an equalizing action be provided for in connection with the operation of the arm device, because of requirements for slight self-adjustment of the tools with relation to each other, and requirements for compensation in the case that one side of the double structure would come up against its stop a slight interval before the other one.

The side plates being the same in the carriers, they are not specially described. The lower tool slide, in the form of a wide bar, with the rack teeth at its upper end, is shown at its lower end at 21 in Fig. 26, and carries three tools 111, held in adjusted position by the set screws 112. The upper tool slide bars each having rack teeth and set side by side above the lower bar, are shown at 20*a* and 20*b* in Fig. 26.

A set of three tools is provided for each of the upper slide bars, tools 132 and 134 for the two crank pins 126 and 128, and the tools 133, one on each slide bar, for doing the same operation on the balancer portion 127 of the shaft, making six tools in all of the two upper slide bars.

The tool arrangement on all of the slides together provide for the full turning operation required. They are shown in Fig. 26, as they will be at the end of the feeding operation.

Figure 26:
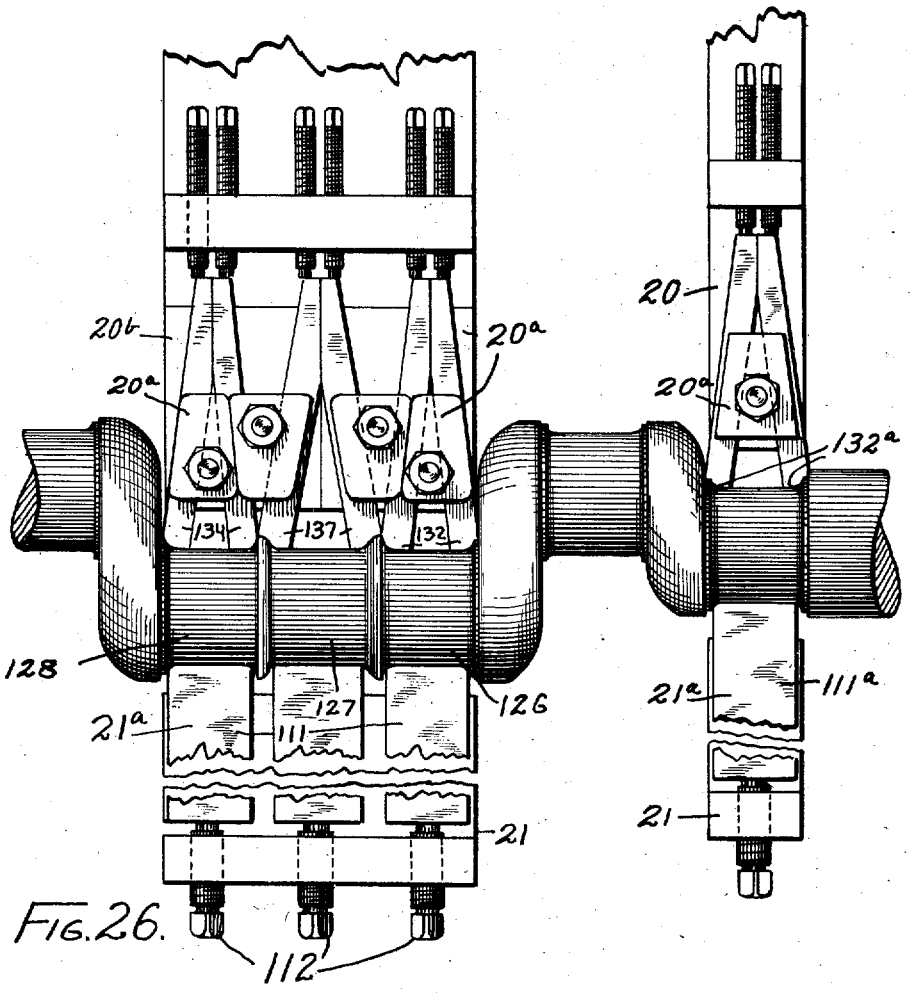
Figure 26 is a semi-diagrammatic plan view showing a crank shaft with the tools applied thereto.

A comparison of the tool arrangement is given in Fig. 26 with the arrangement in the other carriers. The upper and lower slide bars 20 and 21 are shown as equipped with the tools 111*a* and 132*a*. The tools operate to turn the cheek and fillet and the pin. Referring to the tools of one of the single carrying frames, the outer edge of the tools 132*a* perform the cheeking operation, and the rest of the tools 132*a* turn the fillet and twin part of the pin. The tool 111*a* turns the pin and overlaps the operation of the tools 132*a*, thus avoiding tool marks.

The operating arm in the instance of the special carriers, is formed of three elements 112, 113 and 114. The three are mounted and pivoted by a single pin 86*a* corresponding in location and function to the pins 86 heretofore described. The teeth on the ends of the arms are shown at 112*a* and 113*a* for the outer bars, each one of which engages one of the upper slide bars, and the teeth 114*a* for the inner arm which engage on the lower slide bar.

The arm 114 has on its outer end a pin 117 on which is mounted with a moving fit a cross head 118, having its ends rounded to engage in bearings 119 on the outer ends of the two outer arms 112 and 113. The bearings 119 are fitted with bushings 120 having the cylindrical sockets in which the rounded ends of the cross head are seated, and these bushings are open at 121, so that the cross head can slide as well and rock in each of the bearings 119.

A connector 122 forked at 123 whereby it is connected to an operating piston rod, is secured to or formed as part of the central arm 114, said connector having shoulders 124 to limit the movement of the two outer arms.

It will be evident that when power is applied to the central arm that this arm will rock, carrying with it the two outer arms, which arms can adjust themselves with relation to the central arm, and also with relation to each other. The gib, set screws, and slide arm stop devices will be the same as in the narrower structures of the single carriers except for their width and the two upper slide bars will each carry a lug to act against the stops.

As stated with relation to the general diagram, it is desirable in a lathe of the type in question to be able to do the working in a speedy as well as a very accurate manner, so that a rapid traverse of the tools to working position, a fast roughing cut to turn the cheeks, followed by a slow feed when the tools are all in engagement with the pins themselves, is highly necessary. The rapid traverse should then apply to withdraw the tools, as the machine comes to a stop. By our invention we supply these various movements in an automatic manner in an operation which turns all of the crank pins at once.

In Figs. 10 to 14, and in the front view in Fig. 4, is shown the specific embodiment, differing, as has been noted, from the diagram of Fig. 1, whereby these various steps are provided for.

The starting lever 6, with its connection to the motor starting switch (not shown), and the slotted member, and its connections to the master cam and to the pump valve, is shown in the diagram of Fig. 1 substantially as it appears in the mechanism. The auxiliary control lever 4 and its connections have been described in full.

The master cam is formed by means of grooves which have been marked 15 on a slide bar 108, that is held in a suitable groove in the machine base. It has a rack which has been indicated at 16*d* for operating it, said rack being driven by a gear 16*c* located on a cross shaft 16*a*.

This cross shaft is used because the cross head 14 of the master cylinder 12 is at the rear of the machine. The cross head is connected to a rack marked 16 (Fig. 10) by means of a stud on the rack engaging a slotted portion of the cross head. The rack is slidably held in the machine base as in the instance of the bar 108, and hence moves to and fro with the cross head. The rack 16 meshes with a gear 16*b*, which is on the rear end of the cross shaft, thus driving the cam slide 108.

The vertical bar 6*e* from the starting and stopping device, whereby the cam normally controls the valve position on the pump, is held down by a spring 6*g*, and has a pin 6*h* as has been indicated on the diagram whereby it engages the grooves 15 on the master cam element.

The cam surfaces are designed as has been indicated to give slow and fast, and forward and reverse position to the pump valve.

In order to permit of adjustment at one end of the stroke we provide for an extension 109 for the mid rib of the cam structure, said extension being of the same rib form, and being slotted and held in place by a screw.

The mechanism of the hydraulic system is shown in general assembly in Figs. 2 and 3, and the details of the cylinder and pistons carried by the cam operated frames or carriers, together with the oil connections and valves, are shown in Figs. 5, 6, 7 and 8.

Referring first to the general assembly, there are in this case five cylinders 11*a* grouped in a suitable case, the piston rod 13*a* of the pistons 11 being connected to the cross head 14, preferably by means of nuts and threaded ends, as will be obvious without particular illustration. The cross head is guided by means of the set of piston rods 13*a* which are individually connected to the cross head.

Instead of the pipes shown in the diagram, the main oil chest 53*a* is provided with passageways here numbered 53 and 54. As shown in Fig. 5 and Fig. 6, the numbers on the several pipes and valves correspond to the numbers in the diagram and need not be again described.

The flexible connection to the cylinder 24, which is provided for each cylinder, thus permitting the said cylinder to move with the carriers, is provided for either by flexible pressure tubing or by some type of jointed arm, of which we have shown an illustration.

This arm is formed of a set of tapered plugs 26*a*, 38, and 36, which have sleeved onto them the two arms 37 and 39. The plug 36 has in addition a sleeved connection with the member 32 which is fixed except for a mounting which permits of motion in two planes. This motion is provided for by three bearings 33, 34, and 35, as shown, which are held together by means of pins driven through the assembly and having a peripheral keying action within each of the bearings or the arms extending therefrom, as shown in Fig. 8.

The several plugs and arms of the jointed conduit element are held together by means of nuts 43 screwed on to the ends of the tapered plugs.

The eyes 44, by means of which the pistons 25 in the carrier cylinders 24, are coupled to the bifurcated ends of the operating arms, are indicated in Figs. 5 and 6.

The operation of the machine is as follows:—A shaft to be turned, which shaft has its journals in proper condition for engagement by the steady rests, is mounted in the spindle chucks, and the several steady rests (Figs. 22 and 23) are adjusted, if need be, by the use of the set screws to get a true center support for the shaft, and a proper abutment at the sides with the carrying members.

The proper tools having been placed in the tool slides in the several carrying frames, and the amount of turning having been calculated, the stop gibs are adjusted (Fig. 20) so as to bring the tools to a stop when the work is finished.

The control cam is arranged so as to bring the tools up to working position rapidly, and then follow with the various turning feeds.

It will ordinarily be the practice to use a machine for the same type of shaft as a regular work for that machine, and the main adjustments will be made for one job, and merely watched to take care of any looseness or wear on the parts.

The crank pins on the shaft to be turned will revolve alike to the carrying members, due to prearranged nature of the two eccentric shafts, and tendency of the carrying frames to bind, because of some slight irregularities, and hence cause uneven action on the tools, will be avoided because of the pivotal connection between the carrying frames and the upper eccentric shaft.

The oil feed pump is intended to be operated continuously, and for each operation the machine motor is started by throwing the lever 6 to the left (Fig. 1) and then back toward the right to full running position. This will set the crank shaft to be turned into motion, with its axis of rotation central with the spindles. The starting and full running position of the motor switch in the particular illustrated instance is arranged so that the neutral is at the center, the starting position at the far left and the full running position intermediate the two, and also at the left. This is familiar practice.

The operator will then have freed the lever 4 for motion because the stud 6*a* on the lever 6 will be in the main slot in the plate 6*e*. He will push the handle 4 to the left, which will raise the stud or roller 6*h* in the terminal vertical cam slot in the control cam, which will be accompanied by an opening of the pump valve 3 to a position of delivering oil at maximum quantity, and will give a rapid traverse to the tools.

The oil will move the pistons in the master cylinder 12 which will result in the cross head 14 setting the control cam into motion, which takes place at once. Since the roller 6*h* has been moved to the top of the cam, the operator will not have to touch the handle 4 after starting up the mechanism, because the cam will thereafter control the position of the valve.

It will be noted also that the operator cannot move the lever 4 in a starting movement until the motor has been brought to full running condition.

The cross head of the master piston operates the series of pistons 11, which act as individual oil pumps to deliver oil to the working cylinders on the several carrying frames. The pistons 25 in the working cylinders move the actuating arms, whose toothed ends move the several tool slides.

As the control cam is moved it causes a motion of the rod 6*e*, and provides for a rapid tool movement toward the work, then for a working cut of the cheeking tools which is fairly rapid, then a feeding movement which is slow, followed by a rapid return movement of the tool slides to starting position, the last movement of the control cam being one which shuts off the valve 3. This rapid return movement takes place after the cam has rocked the plate 6*e* sufficiently to throw the motor control lever to neutral or stopped position of the motor switch. The operator, by depressing the dog in the lever 4, can rock the lever to a position to shut off the valve, or return the tools by rapid traverse to starting position, even when the cam is in a running position, which provides a safety tool stop.

The stops are arranged so that the tools stop prior to the action of the control cam which stops the spindles and shuts the control valve. This causes no breakage of mechanical parts because the result is merely to build up pressure, which opens the check valves, and it serves a very useful purpose because the tools after the feed has stopped will still take a very fine film of metal from the work and remove tool marks and give a highly finished result.

During this pause of the tools, the full oil pressure is upon the tools, as has been stated, and until the control cam completes its travel and reverses the direction of travel for the tools, the excess pressure is by-passed by the relief valves.

A pause of the tools with full working pressure against them would not be possible in a direct mechanical drive, as there would be no relief for the pressures being built up, but with our hydraulic system excess pressures above the working pressure may be dissipated and the tools held against a stop in sizing relationship to the work until the control cam reaches its reversing point.

We have not shown various modifications of our structure, and have given merely a single concrete illustration of our invention, but it will be understood that modifications, different arrangements, substitution of equivalent structure, change in size of parts and the like, can be employed readily without departing from the spirit of the claims that follow, in which we define the invention inherent in our disclosures.

Having thus described our invention, what we claim as new and desire to secure by Letters Patent, is:—

1. In a crank shaft lathe, the combination of means for revolving a crank shaft to be turned upon its axis, a plurality of carrying members, tools in said members, means for moving the carrier members in the paths traversed by a plurality of the crank pins of the shaft to be turned, hydraulic mechanisms on the carrying members and movable therewith, means whereby said mechanisms move the tools, and flexible connections leading a hydraulic fluid to the hydraulic mechanisms.

2. In a crank shaft lathe, the combination of means for revolving a crank shaft to be turned upon its axis, a plurality of carrying members, tools in said members, means for moving the carrier members in the paths traversed by a plurality of the crank pins of the shaft to be turned, hydraulic mechanisms on the carrying members, means whereby said mechanisms move the tools, and flexible connections leading a hydraulic fluid to the hydraulic mechanisms, a series of hydraulic pumps and means for operating the same, said pumps being connected to said flexible connections.

3. In a crank shaft lathe, the combination of means for revolving a crank shaft to be turned upon its axis, a plurality of carrying members, tools in said members, means for moving the carrier members in the paths traversed by a plurality of the crank pins of the shaft to be turned, hydraulic mechanisms on the carrying members, means whereby said mechanisms move the tools, and flexible connections leading a hydraulic fluid to the hydraulic mechanisms, a series of hydraulic pumps and means for operating the same, said pumps being connected to said flexible connections, said operating means comprising a single member connected to each of the pumps and actuated hydraulically.

4. In combination with a mounting means, a tool supporting bar having rack teeth thereon, another tool supporting bar having rock teeth thereon facing the rack teeth of the first bar, and gear means on the mounting means engaging both sets of teeth, the one bar extending beyond the other, and means for mounting a tool on said extension of the one bar, and a tool on said other bar so as to oppose the tool mounted on the said extension, whereby rotation of said gear means will move the tools toward each other or away from each other, said tool supporting bars arranged to slide one on the top of the other, and confined laterally by said mounting means, said bars being confined vertically by a gib bearing on the edge of one of the bars.

5. In combination with a mounting means, a tool supporting bar having rack teeth thereon, another tool supporting bar having rack teeth thereon facing the rack teeth of the first bar, and gear means on the mounting means engaging both sets of teeth, the one bar extending beyond the other, and means for mounting a tool on said extension of the one bar, and a tool on said other bar so as to oppose the tool mounted on the said extension, whereby rotation of said gear means will move the tools toward each other or away from each other, said tool supporting bars arranged to slide one on the top of the other, and confined laterally by said mounting means, one of said bars having an abutment to engage a stop, and a stop on the mounting means.

6. In combination with a mounting means, a tool supporting bar having rack teeth thereon, another tool supporting bar having rack teeth thereon facing the rack teeth of the first bar, and gear means on the mounting means engaging both sets of teeth, the one bar extending beyond the other, and means for mounting a tool on said extension of the one bar, and a tool on said other bar so as to oppose the tool mounted on the said extension, whereby rotation of said gear means will move the tools toward each other or away from each other, said tool supporting bars arranged to slide one on the top of the other, and confined laterally by said mounting means, one of said bars having an abutment to engage a stop, and a stop on the mounting means, said stop formed as a gib so supported as to engage the top of the upper one of said bars.

7. In combination with a mounting means, a tool supporting bar having rack teeth thereon, another tool supporting bar having rack teeth thereon facing the rack teeth of the first bar, and gear means on the mounting means engaging both sets of teeth, the one bar extending beyond the other, and means for mounting a tool on said extension of the one bar, and a tool on said other bar so as to oppose the tool mounted on the said extension, whereby rotation of said gear means will move the tools toward each other or away from each other, said tool supporting bars arranged to slide one on the top of the other, and confined laterally by said mounting means, one of said bars having an abutment to engage a stop, and a stop on the mounting means, said stop formed as a gib so supported as to engage the top of the upper one of said bars, and means for adjusting said gib lengthwise to regulate the stopped position of the tool bars.

8. In a lathe the combination with a frame, of means thereon for engaging and rotating a crank shaft on its axis so that the crank pins move in an eccentric path, a series of carrier members some in contact and some interspaced from each other, means for moving said carriers eccentrically with the crank pins, tools mounted in said carriers, and spacing means mounted on the frame and lying between the spaced carrier members and in bearing engagement therewith.

9. In a lathe the combination with a frame, of means thereon for engaging and rotating a crank shaft on its axis so that the crank pins move in an eccentric path, a series of carrier members some in contact and some interspaced from each other, means for moving said carriers eccentrically with the crank pins, tools mounted in said carriers, and spacing members mounted on the frame and lying between the spaced carrier members and in bearing engagement therewith, some at least of said spacing members embodying steady rest means for the crank shaft.

10. In a lathe the combination with a frame, of means thereon for engaging and rotating a crank shaft on its axis so that the crank pins move in an eccentric path, a series of carrier members some in contact and some interspaced from each other, means for moving said carriers eccentrically with the crank pins, tools mounted in said carriers, and spacing members mounted on the frame and lying between the spaced carrier members and in bearing engagement therewith, and flexible power delivery means connected to said carriers and arranged to feed the tools in said carriers.

11. In a lathe the combination with a frame, of means thereon for engaging and rotating a crank shaft on its axis so that the crank pins move in an eccentric path, a series of carrier members, means for moving said carrier members eccentrically with the crank pins, and tool supporting members arranged in the carriers so that each carrier member has a plurality of tools to engage the pins to be turned from opposite sides, and means for actuating the tool supporting members comprising an operating mechanism on the carriers, a source of power, and means for connecting said source of power flexibly to said operating mechanism.

12. In a crank shaft lathe having eccentrically moving means thereon for turning a series of crank pins of a crank shaft revolving on its axis, a hydraulic driving mechanism for the tools in said eccentrically moving means, and means for supplying hydraulic power thereto comprising a control valve, and a master piston, and automatic means operated by the piston to shift the control valve, including a cam element.

13. In a crank shaft lathe having eccentrically moving means thereon for turning a series of crank pins of a crank shaft revolving on its axis, a hydraulic driving mechanism for the tools in said eccentrically moving means, and means for supplying hydraulic power thereto comprising a control valve, and a master piston, and automatic means operated by the piston to shift the control valve, including a cam element, a starting lever for the lathe, a lever for opening the control valve, and interlocks between said levers inhibiting their motion in other than predetermined relation.

14. In a lathe the combination with a frame, of means thereon for engaging and rotating a crank shaft on its axis so that the crank pins move in an eccentric path, a series of carrier members, means for moving said carrier members eccentrically with the crank pins, and tool supporting members arranged in the carriers so that each carrier member has a plurality of tools to engage the pins to be turned from opposite sides, and means for actuating the tool supporting members comprising an operating mechanism on the carriers, a source of power, and means for connecting said source of power flexibly to said operating mechanism, said source of power having a main unitary power delivery means, and a series of auxiliary power delivery means operated by the main means, one for each carrier.

15. In a lathe the combination with a frame, of means thereon for engaging and rotating a crank shaft on its axis so that the crank pins move in an eccentric path, a series of carrier members, means for moving said carrier members eccentrically with the crank pins, and tool supporting means on the carriers, tool feeding means supported on the carriers, and comprising hydraulic elements connected to said feeding means, and flexible passageways supplied with fluid under pressure for applying a source of power to each tool feeding means.

16. In a lathe the combination with a frame, of means thereon for engaging and rotating a crank shaft on its axis so that the crank pins move in an eccentric path, a series of carrier members, means for moving said carrier members eccentrically with the crank pins, and tool supporting means on the carriers, tool feeding means on the carriers, and comprising hydraulic elements connected to said feeding means, and flexible means for applying a source of power to each tool feeding means, said source of power having a main power delivery means, and a series of auxiliary power delivery means operated by the main means, one for each carrier.

17. In a lathe the combination with a frame, of means thereon for engaging and rotating a crank shaft on its axis so that the crank pins move in an eccentric path, a series of carrier members, means for moving said carrier members eccentrically with the crank pins, and tool supporting means on the carriers, and tool feeding means on the carriers, including hydraulic cylinders and pistons, and flexible conduits for delivery of fluid to said cylinders, a main source of supply of fluid, and a series of auxiliary fluid supply means operated from the main source, one for each hydraulic cylinder.

18. In a lathe the combination with a frame, of means thereon for engaging and rotating a crank shaft on its axis so that the crank pins move in an eccentric path, a series of carrier members, means for moving said carrier members eccentrically with the crank pins, and tool supporting means on the carriers, and tool feeding means on the carriers, including hydraulic cylinders and pistons, and flexible conduits for delivery of fluid to said cylinders, a main source of supply of fluid, and a series of auxiliary fluid supply means operated from the main source, one for each hydraulic cylinder, and means for controlling the rate of flow of fluid from the main source.

19. In a lathe the combination with a frame, of means thereon for engaging and rotating a crank shaft on its axis so that the crank pins move in an eccentric path, a series of carrier members, means for moving said carrier members eccentrically with the crank pins, and tool supporting means on the carriers, and tool feeding means on the carriers, including hydraulic cylinders and pistons, and flexible conduits for delivery of fluid to said cylinders, a main source of supply of fluid, and a series of auxiliary fluid supply means operated from the main source, one for each hydraulic cylinder, and automatic mechanism for actuating the last named means in a prearranged cycle.

20. In a lathe the combination with a frame, of means thereon for engaging and rotating a crank shaft on its axis so that the crank pins move in an eccentric path, a series of carrier members, means for moving said carrier members eccentrically with the crank pins, and tool supporting means on the carriers, and tool feeding means on the carriers, including hydraulic cylinders and pistons, and flexible conduits for delivery of fluid to said cylinders, a main source of supply of fluid, and a series of auxiliary fluid supply means operated from the main source, one for each hydraulic cylinder, and automatic mechanism for actuating the last named means in a prearranged cycle, said automatic means arranged to stop the flow at the end of the cycle, and separate positive stops for each of said tool feeding means.

21. In a lathe for turning a plurality of the crank pins of a crank shaft simultaneously, the combination of tool carrying frames, means for supporting and rotating a shaft whose pins are to be turned, means for causing the frames to move in synchronism with the pins of the shaft, said means comprising a pair of eccentric members engaging said frames, one located at the front of the machine above the location of the shaft to be turned, and the other located below the shaft and rearwardly of the machine, whereby the shaft may be inserted at the front of the machine, and during the turning operation the chips and lubricant will fall clear of the lower eccentric member, said lathe having a frame in which said parts are mounted, and a portion of said frame arranged as a barrier between the lower eccentric member and the front of the machine.

22. An operating device to cause a tool carrying frame to move in an eccentric path in lathes of the character described, comprising a pair of eccentrics, on one of which eccentrics the frame is directly journaled and on the other of which eccentrics the frame has a mounting element with respect to which the frame is movable.

23. In a crank shaft lathe the combination of means for revolving a crank shaft to be turned upon its axis, a plurality of carrying members, means for moving them in synchronism with the cranks on the said revolving shaft, tools in said members, a pair of slides for retaining the tools in each of said members, hydraulic mechanism carried upon the members and moving therewith, and power means operated by the hydraulic mechanism, and connected with both slides, said hydraulic mechanism being reversible to move the slides in and out of engagement with the work.

24. In a crank shaft lathe the combination of means for revolving a crank shaft to be turned upon its axis, a plurality of carrying members, means for moving them in synchronism with the cranks on said shaft, a slide in each of said carrying members, a tool in each slide, hydraulic mechanism carried by the members and moving therewith, and power means operated by the hydraulic mechanism and connected with the slides, said hydraulic mechanism being reversible to move the slides in and out of engagement with the work.

25. In a crank shaft lathe, means for mounting at its ends and revolving a crank shaft on its axis, a series of tool carrying frames, tool elements in said frames, means for feeding the tool elements in the frames, said elements and means lying within the lateral confines of the frames, means for moving the frames in like paths to the pins on the crank shaft, and at least one spacer plate, said frames and spacer plate mounted in sliding contact with each other, and thrust bearing means secured to the lathe and having lateral contact with the ends of the series of frames, for the purpose described.

26. In a crank shaft lathe, means for mounting at its ends and revolving a crank shaft on its axis, a series of tool carrying frames, tool elements in said frames, means for feeding the tool elements in the frames, said elements and means lying within the lateral confines of the frames, means for moving the frames in like paths to the pins on the crank shaft, and at least one spacer plate, said frames and spacer plate mounted in sliding contact with each other, and thrust bearing means secured to the lathe and having lateral contact with the ends of the series of frames, for the purpose described, said spacer plate arranged to serve as a steady rest for a line bearing of the crank shaft.

27. A crank shaft lathe comprising a frame, crank shaft rotating means in the frame, a pair of shafts on opposite sides of the rotating means and rotating therewith, eccentrics on said shafts, a series of tool carrying frames, one for each crank pin to be turned, tools mounted and fed in said frames, steady rest plate means for the crank shaft, means connecting the frame with the eccentrics, said frames and steady rest plate means having extended lateral contact with each other so as to form a juxtaposed series as a solid metal mass across the lathe.

28. A crank shaft lathe comprising a frame, crank shaft rotating means in the frame, a pair of shafts on opposite sides of the rotating means and rotating therewith, eccentrics on said shafts, a series of tool carrying frames, one for each crank pin to be turned, tools mounted and fed in said frames, steady rest plate means for the crank shaft, means connecting the frame with the eccentrics, said frames and steady rest plate means having extended lateral contact with each other so as to form a juxtaposed series as a solid metal mass across the lathe, and lateral thrust receiving elements fast in the lathe and having extended lateral contact with the outer faces of said juxtaposed series.

29. In a crank shaft lathe the combination with a frame, of means thereon for engaging and rotating a crank shaft on its axis so that the crank pins move in an eccentric path, a series of tool carrier members spaced from each other, tools mounted on said carriers, means for moving said carriers eccentrically with the crank pins, end thrust plates; spacing means between the adjacent carriers whereby said carriers may be held tightly together to prevent deviation of the tools incident to the necessary running fit of the carriers on the means for moving them.

30. In a crank shaft lathe the combination with a frame, of means thereon for engaging and rotating a crank shaft on its axis so that the crank pins move in an eccentric path, a series of tool carrier members spaced from each other, tools mounted on said carriers, means for moving said carriers eccentrically with the crank pins, end thrust plates; spacing means between the adjacent carriers whereby said carriers may be held tightly together to prevent deviation of the tools incident to the necessary running fit of the carriers on the means for moving them, said thrust plates, tool carrier members and spacer plates forming a solid metallic mass longitudinally and transversely of the lathe.

31. In a lathe for turning a plurality of the crank pins of a crank shaft simultaneously, the combination of tool carrying frames, means for supporting and rotating a shaft whose pins are to be turned, means for causing the frames to move in synchronism with the pins of the shaft, said means comprising eccentric members engaging said frames, one located above the location of the shaft to be turned and one below the shaft and rearwardly of the supporting means for the shaft to be turned, whereby the shaft may be inserted at the front of the machine, and during the turning operation the chips and lubricant will fall clear of the lower eccentric member, said machine having a barrier between the lower eccentric and the front of the machine.

WILLIAM F. GROENE.
HAROLD J. SIEKMANN.